United States Patent
Sunil Kumar et al.

(10) Patent No.: US 10,837,789 B2
(45) Date of Patent: Nov. 17, 2020

(54) METHOD AND SYSTEM FOR DETERMINING AN OPTIMAL PATH FOR NAVIGATION OF A VEHICLE

(71) Applicant: WIPRO LIMITED, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 102 days.

(21) Appl. No.: 16/167,818

(22) Filed: Oct. 23, 2018

(65) Prior Publication Data

US 2020/0072623 A1 Mar. 5, 2020

(30) Foreign Application Priority Data

Aug. 30, 2018 (IN) .............................. 201841032633

(51) Int. Cl.
*G01C 21/34* (2006.01)

(52) U.S. Cl.
CPC ..... *G01C 21/3453* (2013.01); *G01C 21/3446* (2013.01)

(58) Field of Classification Search
CPC .......................... G01C 21/3453; G01C 21/3446
See application file for complete search history.

(56) References Cited

U.S. PATENT DOCUMENTS

| | | | |
|---|---|---|---|
| 6,304,818 B1 * | 10/2001 | Kamiya | G01C 21/30 701/520 |
| 8,868,328 B1 | 10/2014 | Estkowski | |
| 9,202,382 B2 | 12/2015 | Klinger et al. | |
| 2017/0144704 A1 * | 5/2017 | Robinson | B60Q 9/00 |
| 2018/0164827 A1 * | 6/2018 | Chu | G05D 1/0088 |
| 2018/0267548 A1 * | 9/2018 | Sumioka | B60W 30/09 |
| 2019/0079528 A1 * | 3/2019 | Zhu | G01O 21/3453 |
| 2019/0235499 A1 * | 8/2019 | Kazemi | G05D 1/0088 |
| 2019/0317508 A1 * | 10/2019 | Zhang | G08G 1/096775 |
| 2020/0049522 A1 * | 2/2020 | Wang | G01C 21/3453 |

OTHER PUBLICATIONS

Au, T., et al., "Autonomous Intersection Management for Semi-Autonomous Vehicles", 20 pages.
Pongpunwattana, A., et al., "Real-Time Planning for Multiple Autonomous Vehicles in Dynamic Uncertain Environments", Journal of Aerospace Computing, Information, and Communication, vol. 1, No. 12 (2004), pp. 580-604.
Wang, Q., et al., "Cooperative Path-Planning for Multi-Vehicle Systems", Electronics, vol. 3 (2014), pp. 636-660.

* cited by examiner

*Primary Examiner* — Peter D Nolan
*Assistant Examiner* — Ashley L Redhead, Jr.
(74) *Attorney, Agent, or Firm* — Finnegan, Henderson, Farabow, Garrett & Dunner, LLP

(57) ABSTRACT

Disclosed subject matter relates to field of vehicle navigation that performs a method of determining an optimal path for navigation of a vehicle. An optimal path selection system may receive a source point and a destination point from a user and may generate one or more planned paths between the source point and the destination point. Path profiling of the one or more planned paths based on one or more path parameters is performed. Quality of the one or more planned paths based on the path profiling and one or more vehicle parameters is determined. Finally, the optimal path is selected from the one or more planned paths based on the quality to navigate the vehicle.

19 Claims, 10 Drawing Sheets

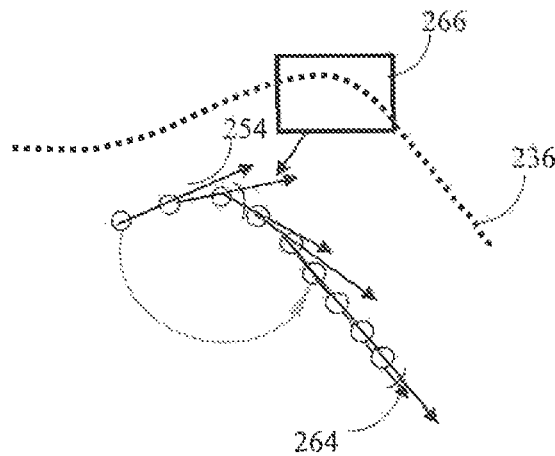
FIG. 2E
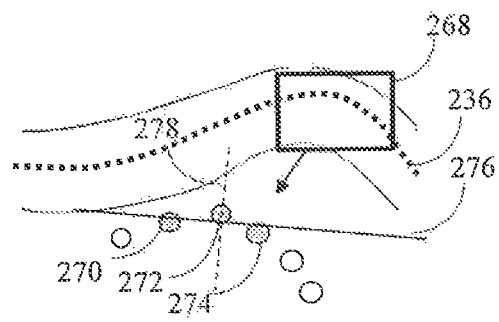
FIG. 2F(1)
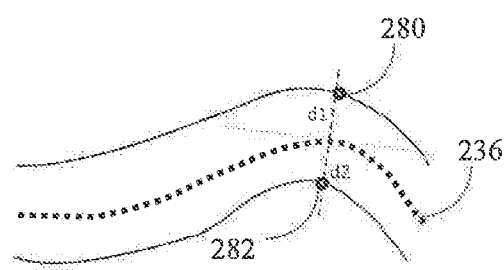
FIG. 2F(2)

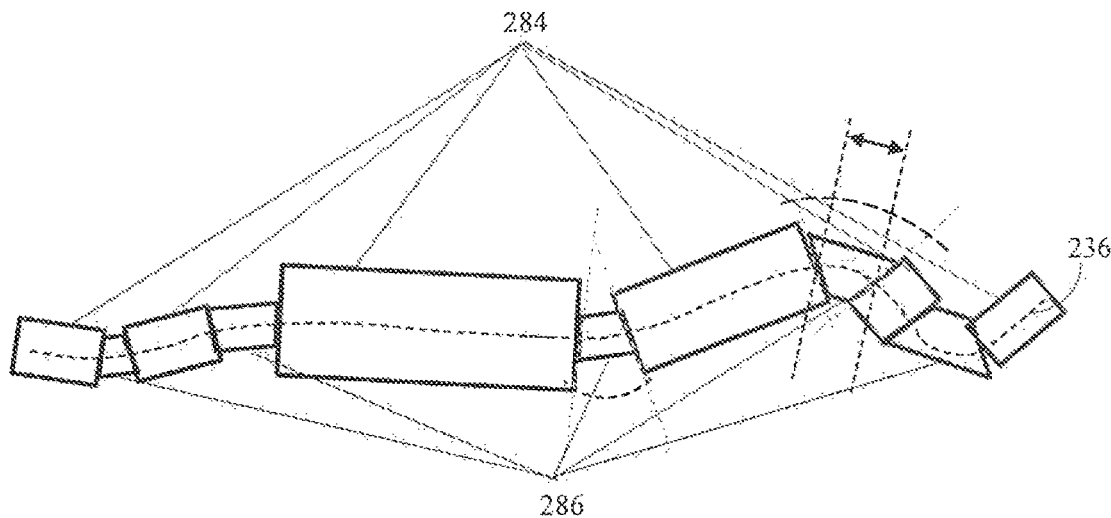

FIG. 2G

| MATHEMATICAL REPRESENTATION OF THE SAMPLE PATH SEGMENTS | PROPERTIES | WIDTH |
|---|---|---|
| 3 METER STRAIGHT STRETCH (WIDTH = 2*VEHICLE WIDTH ) | STRAIGHT STRETCH | NORMAL |
| 1 METER TURN STRETCH OF 5 DEGREE | CURVATURE | IGNORE |
| 3 METER STRAIGHT STRETCH (WIDTH = 2* VEHICLE WIDTH) | STRAIGHT STRETCH | NORMAL |
| 2 METER TURN STRETCH OF 5 DEGREE | | IGNORE |
| 10 METER STRAIGHT STRETCH (WIDTH = 5* VEHICLE WIDTH) | STRAIGHT STRETCH | WIDE |
| 2 METER TURN STRETCH OF 3 DEGREE | | IGNORE |
| 8 METER STRAIGHT STRETCH (WIDTH = 3* VEHICLE WIDTH) | STRAIGHT STRETCH | WIDE |
| 2 METER TURN STRETCH OF 55 DEGREE | CURVATURE (STEEP) | IGNORE |
| 1 METER STRAIGHT STRETCH (WIDTH = 2* VEHICLE WIDTH) | STRAIGHT STRETCH | NORMAL |
| 2 METER TURN STRETCH OF 65 DEGREE | | IGNORE |
| 3 METER STRAIGHT STRETCH (WIDTH = 1.5* VEHICLE WIDTH) | STRAIGHT STRETCH | NARROW |

FIG. 2H

| SPEED GRAPH DATA : LINEAR VS ANGULAR | |
|---|---|
| LINEAR VELOCITY | ANGULAR VELOCITY |
| 0.5 METER /SEC | 45 DEGREE/SEC |
| 1 METER /SEC | 40 DEGREE/SEC |
| 2 METER/SEC | 30 DEGREE/SEC |
| 5 METER/SEC | 20 RAD/SEC |
| 6 METER/SEC | 10 DEGREE/SEC |
| 7 METER/SEC | 5 DEGREE/SEC |
| 8 METER/SEC | 2 DEGREE/SEC |

FIG. 2J(1)

| SPEED GRAPH DATA: STRAIGHT STRETCH VS MAX SPEED | |
|---|---|
| STRETCH LENGTH ($S_{LENGTH}$) | MAX ACHIEVED VELOCITY ($V_{MAX}$) |
| <5 METER | 0.8 METER/SEC |
| 5 METER | 1 METER/SEC |
| 10 METER | 2 METER/SEC |
| 20 METER | 3 METER/SEC |
| 30 METER | 4 METER/SEC |
| 40 METER | 5 METER/SEC |
| > 50 METER | 10 METER/SEC |

FIG. 2J(2)

| OVERALL CURVATURE | MAX ACHIEVED VELOCITY ($V_{MAX}$) |
|---|---|
| 45 DEGREES | 0.5 METER/SEC |
| 30 DEGREES | 0.7 METER/SEC |
| 25 DEGREES | 0.9 METER/SEC |
| 15 DEGREES | 1 METER/SEC |
| 10 DEGREE | 1.5 METER/SEC |

FIG. 2J(3)

| PATH STRETCHES | TRAVEL TIME ($T_T$) (SEC) | ACCELERATION FACTOR ($T_A$) (RANGE 0.0 – 1.0) | CAUTION FACTOR ($T_C$) DUE TO WIDTH (0.0 – 1.0) |
|---|---|---|---|
| 3 METER STRAIGHT STRETCH (WIDTH = 2*VW) | 4.5 | 0.5 | 0.1 |
| 1 METER TURN STRETCH OF 5 DEGREE | 1.5 | 0.2 | 0.2 |
| 3 METER STRAIGHT STRETCH (WIDTH = 2*VW) | 2.8 | 0.5 | 0.1 |
| 2 METER TURN STRETCH OF 5 DEGREE | 3.0 | 0.2 | 0.2 |
| 10 METER STRAIGHT STRETCH (WIDTH = 5*VW) | 6.6 | 1.0 | 0.0 |
| 2 METER TURN STRETCH OF 3 DEGREE | 3.0 | 0.3 | 0.0 |
| 8 METER STRAIGHT STRETCH (WIDTH = 3*VW) | 9.0 | 1.0 | 0.0 |
| 2 METER TURN STRETCH OF 55 DEGREE | 5.0 | 0.1 | 0.1 |
| 1 METER STRAIGHT STRETCH (WIDTH = 2*VW) | 2.0 | 0.2 | 0.1 |
| 2 METER TURN STRETCH OF 65 DEGREE | 6.0 | 0.1 | 0.0 |
| 3 METER STRAIGHT STRETCH (WIDTH = 1.5*VW) | 4.0 | 0.6 | 0.5 |

METHOD AND SYSTEM FOR DETERMINING AN OPTIMAL PATH FOR NAVIGATION OF A VEHICLE

TECHNICAL FIELD

The present subject matter relates generally to field of vehicle navigation, and more particularly, but not exclusively to a method and a system for determining an optimal path for navigation of a vehicle.

BACKGROUND

Automobile industry has seen many advancements over years. Different types of technologies are increasingly being used in vehicles in order to reduce energy consumption, pollution, and congestion while at same time increasing road safety. Path planning is one such technology used in a vehicle in order to help in navigation of the vehicle from a source point to a destination point. A number of planned paths between the source point and the destination point is provided to the user based on the path planning.

Existing techniques provide the planned paths for the vehicle to traverse from the source point to the destination point. However, there may be one or more challenges encountered in the global paths that make it difficult to navigate the vehicle. Some of the challenges include, but are not limited to, road width, curvature, straight stretches and the like. Some of the existing techniques provide methods to overcome few of the challenges. However, as the challenges are not completely resolved using the existing techniques, the planned paths that are provided are not optimal. Moreover, user experience during the navigation of the vehicle is of a degraded quality with the existing techniques.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of method of determining an optimal path for navigation of a vehicle. The method includes receiving, by an optimal path selection system associated with the vehicle, a source point and a destination point from a user. The method also includes generating, by the optimal path selection system, one or more planned paths between the source point and the destination point. The method further includes performing, by the optimal path selection system, path profiling of the one or more planned paths based on one or more path parameters. Further, the method includes determining, by the optimal path selection system, quality of the one or more planned paths based on the path profiling and one or more vehicle parameters. Moreover, the method includes selecting, by the optimal path selection system, the optimal path from the one or more planned paths based on the quality to navigate the vehicle.

Further, the present disclosure includes an optimal path selection system for determining an optimal path for navigation of a vehicle. The optimal path selection system includes a processor and a memory communicatively coupled to the processor. The memory stores the processor-executable instructions, which, on execution, causes the processor to receive a source point and a destination point from a user. Further, the processor generates one or more planned paths between the source point and the destination point. The processor performs path profiling of the one or more planned paths based on one or more path parameters. The processor determines quality of the one or more planned paths based on the path profiling and one or more vehicle parameters. Further, the processor selects the optimal path from the one or more planned paths based on the quality to navigate the vehicle.

Furthermore, the present disclosure comprises a non-transitory computer readable medium including instructions stored thereon that when processed by at least one processor causes an optimal path selection system associated with a vehicle to perform operations comprising receiving a source point and a destination point from a user. Further, the instructions cause the processor to generate one or more planned paths between the source point and the destination point. The instructions cause the processor to perform path profiling of the one or more planned paths based on one or more path parameters. The instructions also cause the processor to determine quality of the one or more planned paths based on the path profiling and one or more vehicle parameters. Finally, the instructions cause the processor to select the optimal path from the one or more planned paths based on the quality to navigate the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 2A:
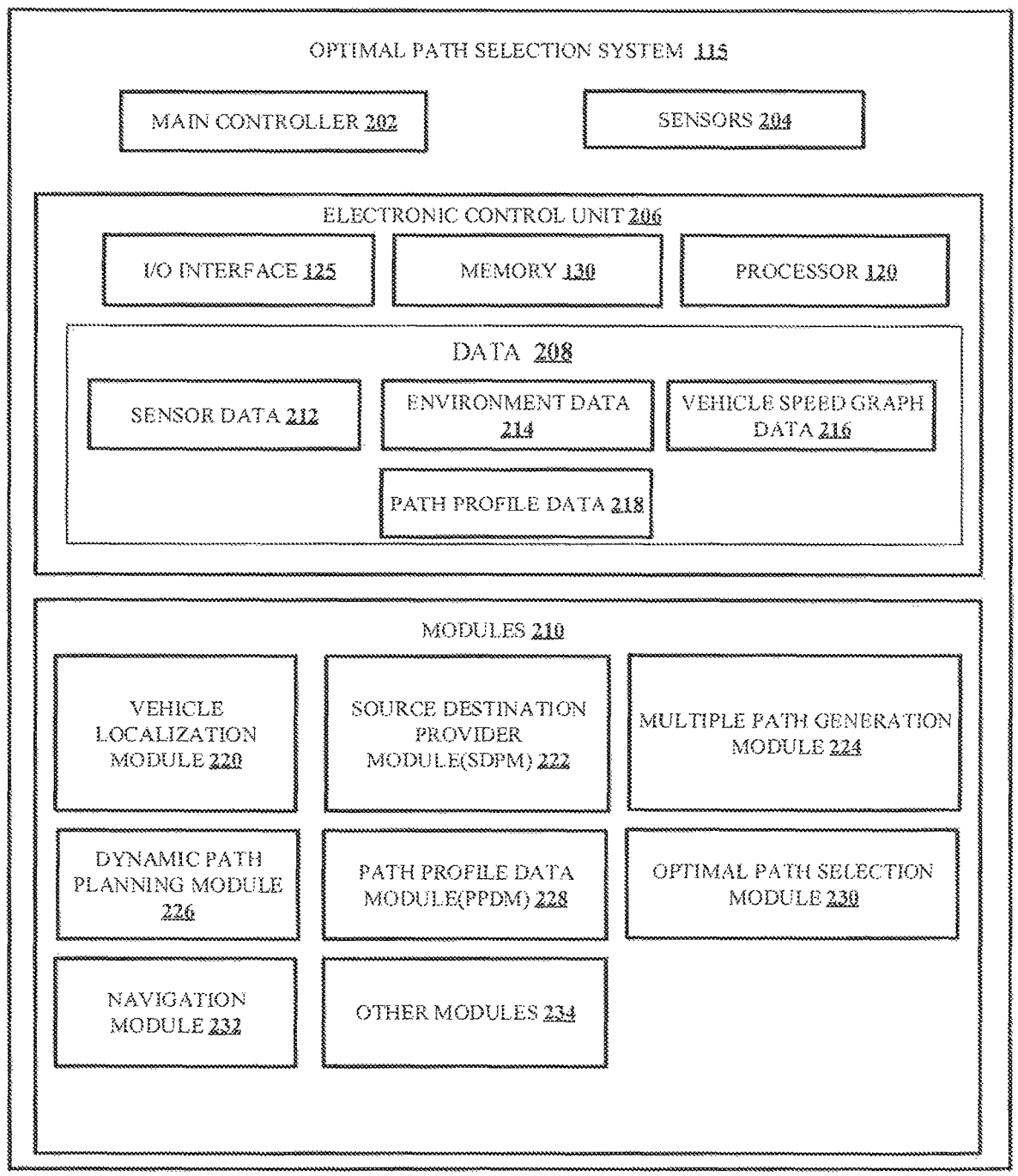
FIG. 2A shows a detailed block diagram of an optimal path selection system for determining an optimal path for navigation of a vehicle, in accordance with some embodiments of the present disclosure.
Figure 2B:
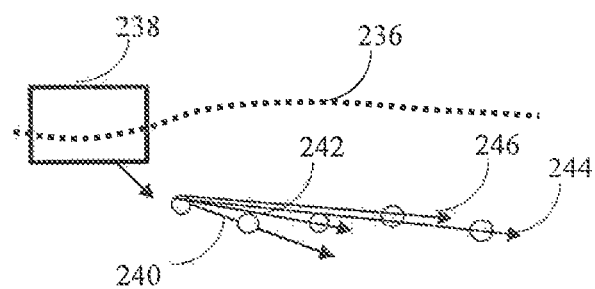
Figure 2C:
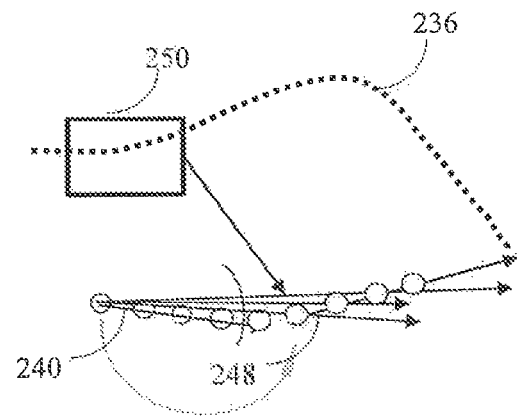
Figure 2D:
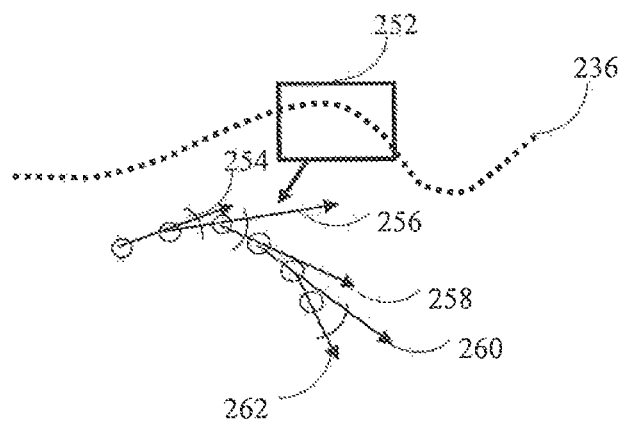
Figure 2I:
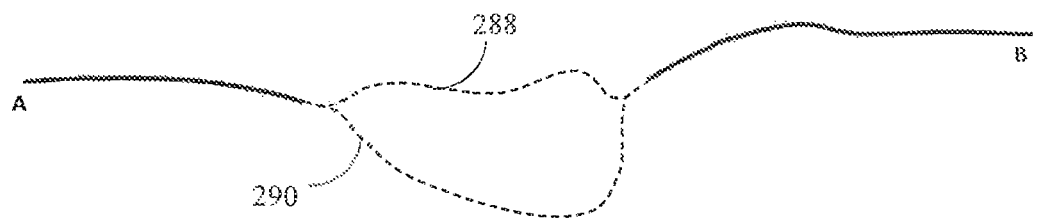
Figure 3:
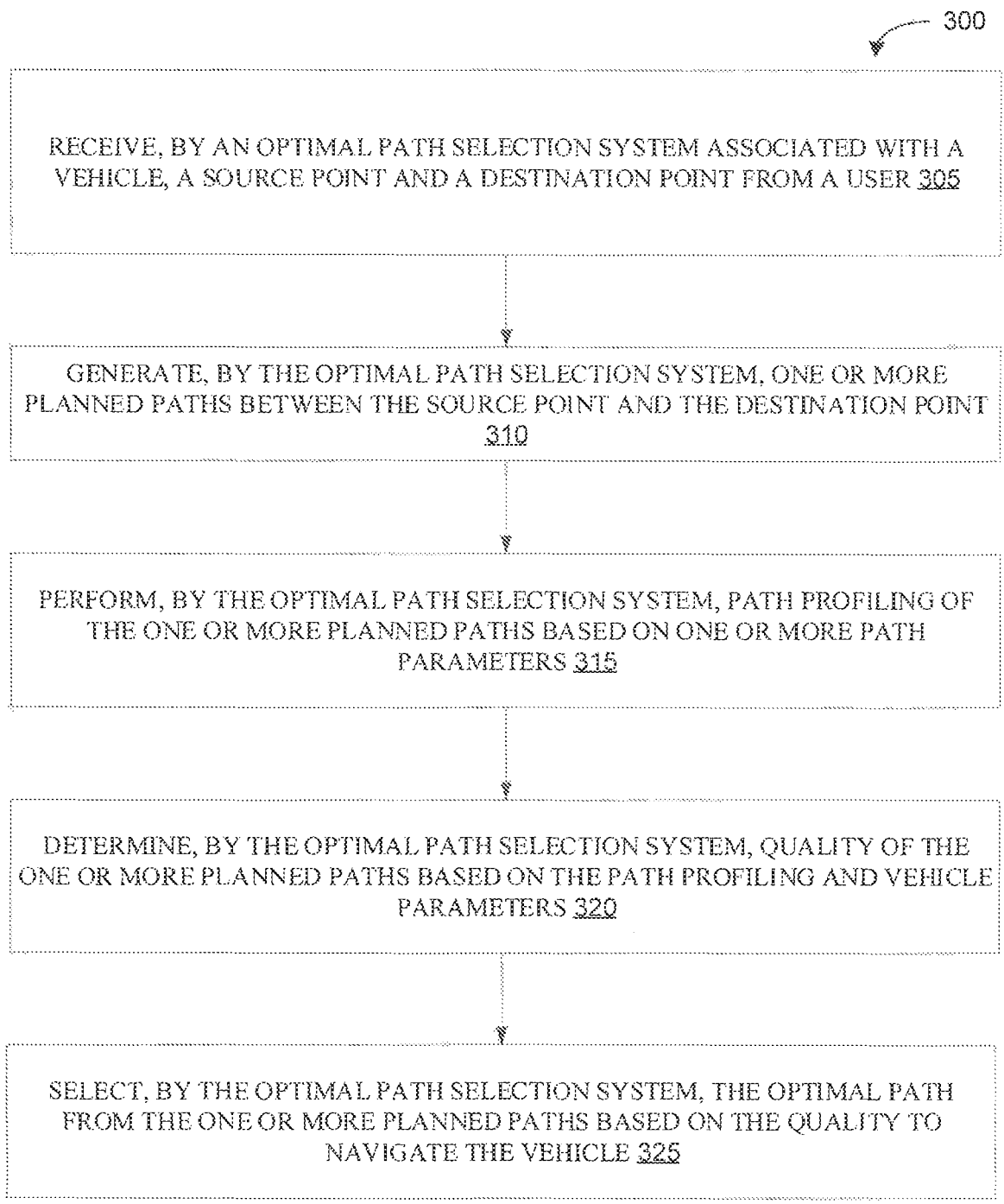
Figure 4:
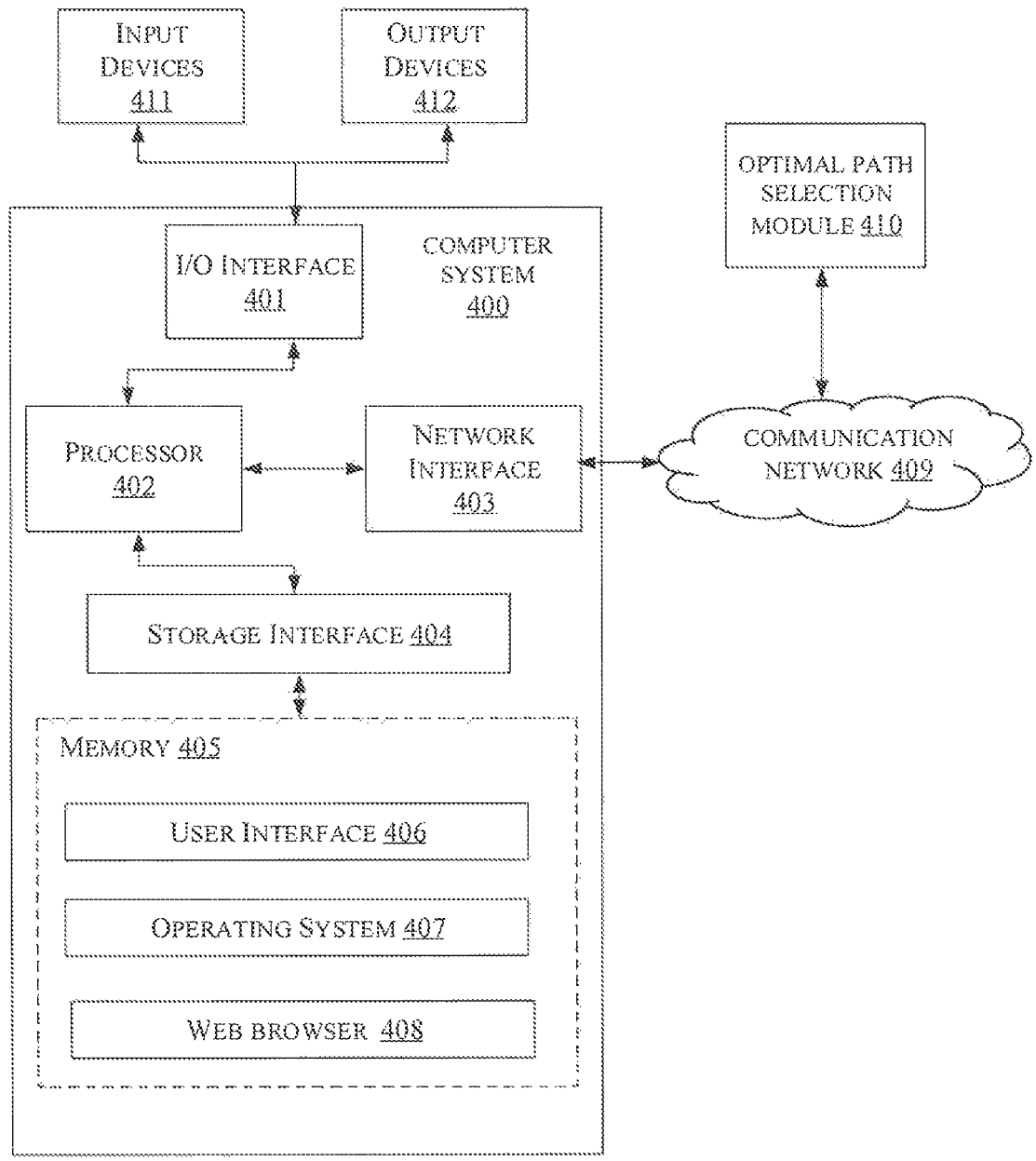

FIG. 2B, FIG. 2C, FIG. 2D, FIG. 2E, FIG. 2F(1)-2F(2), FIG. 2G, and FIG. 2I show exemplary embodiments for determining an optimal path for navigation of a vehicle, in accordance with some embodiments of the present disclosure;

FIG. 2H, FIGS. 2J(1)-2J(3), and FIG. 2K show tables illustrating values corresponding to determination of an optimal path for navigation of a vehicle, in accordance with some embodiments of the present disclosure;

FIG. 3 shows a flowchart illustrating a method of determining an optimal path for navigation of a vehicle, in accordance with some embodiments of the present disclosure; and FIG. 4 is a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for determining an optimal path for navigation of a vehicle. Before a user starts to navigate the vehicle (the vehicle in inactive state or not running condition), an optimal path selection system associated with the vehicle may select an optimal path between a source point and a destination point provided by the user. In some embodiments, the optimal path can also be generated when the user is already navigating the vehicle (the vehicle in active state or running condition).

The optimal path selection system associated with the vehicle, may receive a source point and a destination point from a user. The optimal path selection system may generate one or more planned paths between the source point and the destination point.

Further, the optimal path selection system may perform path profiling of the one or more planned paths based on one or more path parameters. The optimal path selection system may determine quality of the one or more planned paths based on the path profiling and vehicle parameters. Further, the optimal path selection system may select the optimal path from the one or more planned paths based on the quality to navigate the vehicle.

In existing methods, challenges may be faced in selection of the optimal path for the vehicle due to availability of different planned paths and complex trajectories. Therefore, the present disclosure helps in overcoming the challenges faced in selection of the optimal path for the vehicle.

A description of an embodiment with several components in communication with each other does not imply that all such components are required. On the contrary a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
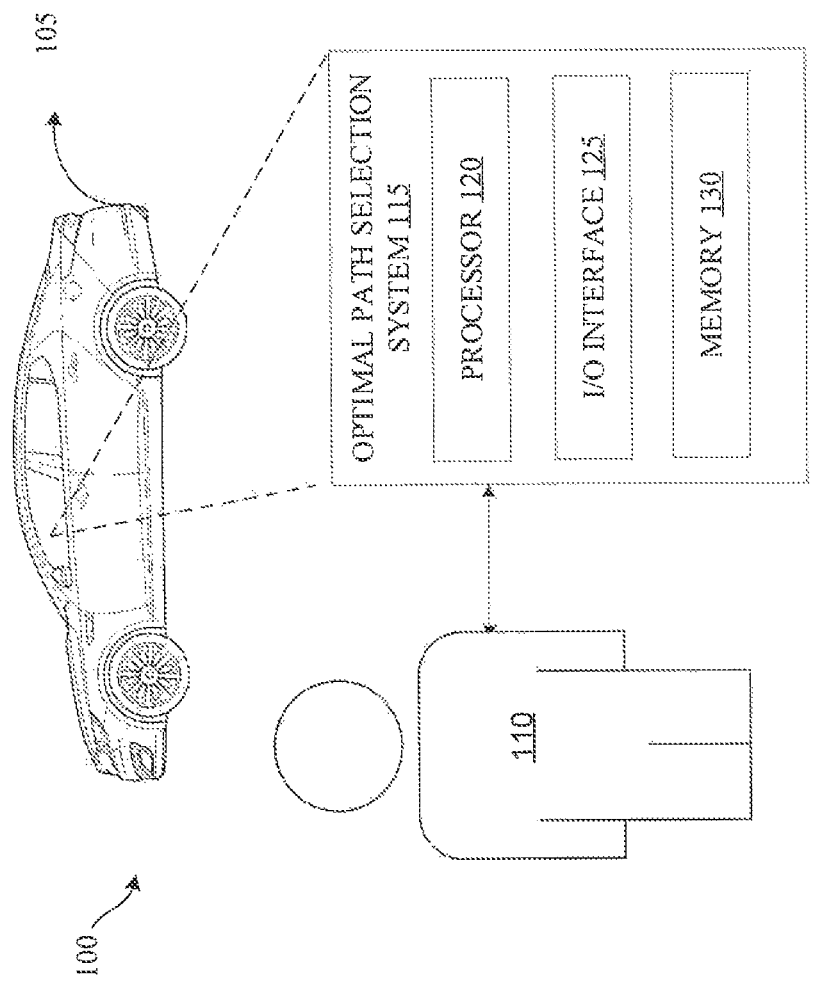
FIG. 1 shows an exemplary environment illustrating determination of an optimal path for navigation of a vehicle, in accordance with some embodiments of the present disclosure.

FIG. 1 shows an exemplary environment 100 for determining an optimal path for navigation of a vehicle, in accordance with some embodiments of the present disclosure.

The environment 100 includes a vehicle 105, a user 110 and an optimal path selection system 115. The optimal path selection system 115 may be associated with an application related to maps including, for example, a navigation application, a repository storing static maps and the like, to determine an optimal path for navigation of the vehicle 105. In some embodiments, the optimal path selection system 115 may be associated with the vehicle 105 via a communication network (not shown in FIG. 1). As an example, the communication network may include a wired communication network or a wireless communication network. In some embodiments, the optimal path selection system 115 may be configured within the vehicle 105 as shown in the FIG. 1. In some other embodiments, the optimal path selection system 115 may be remotely associated with the vehicle 105 via the wireless communication network. As an example, the vehicle 105 may be an autonomous vehicle and may include a bike, a car, a truck, a bus and the like. The autonomous vehicle is defined as a vehicle that is capable of sensing surrounding environment for navigating a path without any human intervention. The autonomous vehicle senses the surrounding environment with help of sensors configured to work in systems including, for example Light Detection and Ranging (LIDAR) system, image capturing devices, Global Positioning System (GPS), and the like.

The optimal path selection system 115 includes a processor 120, an Input/Output (I/O) interface 125 and a memory 130. The I/O interface 125 may be configured to receive a source point and a destination point from the user 110. The source point and the destination point may be provided as inputs to the optimal path selection system 115 by the user 110 associated with the optimal path selection system 115.

Upon receiving the source point and the destination point, the processor 120 may generate one or more planned paths between the source point and the destination point. In some embodiments, the optimal path selection system 115 may generate the one or more planned paths using one or more path planning methods including, for example, Dijkstra's method. A-star method and the like, upon receiving the source point and the destination point. In some embodiments, the processor 120 may store the one or more planned paths in the memory 130 coupled with the processor 120.

The processor 120 may perform path profiling of the one or more planned paths based on one or more path parameters. Examples of the one or more path parameters include, but are not limited to, straight stretches, turn stretches, widths of the planned paths, and the like. In some embodiments, the processor 120 may identify at least one of one or more straight stretches in a planned path or one or more turn stretches in the planned path. The planned path is represented with a number of coordinate points on a static map. In order to identify the one or more straight stretches, the processor 120 may connect a first coordinate point and a second coordinate point on the static map with a base line. The processor 120 may determine one or more reference lines by connecting the first coordinate point with each consecutive coordinate point. The processor 120 may measure deviation angles between the base line and each of the one or more reference lines. The processor 120 may identify a straight stretch in the planned path if a maximum angular threshold is reached based on the measuring. The maximum angular threshold indicates a turn stretch in the planned path. The processor 120 may further shift the base line to identify another straight stretch or another turn stretch in the planned path.

The one or more straight stretches and the one or more turn stretches together represent one or more path stretches in the planned path. In order to identify the one or more turn stretches, the processor 120 may measure curvature angles between each two consecutive coordinate points, two consecutive coordinate points being connected with a line. If the curvature angles are higher than a threshold value, the processor 120 may determine continuance of curvature of a turn stretch in the planned path. If the curvature angles are lesser than the threshold value, the processor 120 may determine an end of the curvature of the turn stretch in the planned path. The processor 120 may determine the measure of curvature for the turn stretch based on the end of the curvature of the turn stretch. The processor 120 may further shift a base line on identifying the end of the curvature of the turn stretch in the planned path to identify another straight stretch or another turn stretch in the planned path.

In some embodiments, the processor 120 may determine corresponding widths of the planned path for the one or more path stretches. In order to determine corresponding widths of the planned path for the one or more path stretches, the processor 120 may identify three consecutive coordinate points in a path stretch on the static map. The processor 120 may draw a horizontal straight line on the three consecutive coordinate points and a perpendicular line to the horizontal straight line to determine a first boundary point and a second boundary point on the static map. The perpendicular line includes a first distance and a second distance. The processor 120 may determine the width of the planned path by combining the first distance and the second distance. The first distance represents a length between the horizontal straight line and the first boundary point and the second distance representing a length between the horizontal straight line and the second boundary point.

Further, the processor 120 may determine quality of the one or more planned paths based on the path profiling and vehicle parameters. In some embodiments, the processor 120 may compare the vehicle parameters of the vehicle with the one or more path parameters for each planned path of the one or more planned paths.

Further, the processor 120 may select the optimal path from the one or more planned paths based on the quality to navigate the vehicle 105. In some embodiments, the processor 120 may provide the optimal path through the I/O interface 125 to be displayed to the user 110. The optimal path selection system 115 and operation is explained in detail in conjunction with FIGS. 2A-2K.

FIG. 2A shows a detailed block diagram of the optimal path selection system 115 for determining the optimal path for navigation of the vehicle 105, in accordance with some embodiments of the present disclosure.

In some implementations, the optimal path selection system 115 may include a main controller 202, sensors 204 and an electronic control unit (ECU) 206. The sensors 204 are coupled to the main controller 202 and the ECU 206, The main controller 202 and the ECU 206 are coupled to each other. The ECU 206 includes the processor 120, the I/O interface 125 and the memory 130. The ECU 206 further includes data 208 and modules 210. In some embodiments, the data 208 may be stored in the memory 130. In one embodiment, the data 208 may include sensor data 212, environment data 214, vehicle speed graph data 216, and path profile data 218. In the illustrated FIG. 2A, the modules 210 are described herein in detail.

In some embodiments, the data 208 may be stored in the memory 130 in form of various data structures. Additionally, the data 208 can be organized using data models, such as relational or hierarchical data models. The data 208 may store data, including temporary data and temporary files, generated by the modules 210 for performing the various functions of the optimal path selection system 115.

In some embodiments, the data 208 stored in the memory 130 may be processed by the modules 210 of the optimal path selection system 115. The modules 210 may be stored within the memory 130. In an example, the modules 210 communicatively coupled to the processor 120 configured in the optimal path selection system 115, may also be present outside the memory 130 as shown in FIG. 2A and implemented as hardware. As used herein, the term modules 210 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 210 may include, for example, a vehicle localization module 220, a source destination provider module (SDPM) 222, a multiple path generation module 224, a dynamic path planning module 226, a path profile data module (PPDM) 228, an optimal path selection module 230, a navigation module 232, and other modules 234. The other modules 234 may be used to perform various miscellaneous functionalities of the optimal path selection system 115. It will be appreciated that such aforementioned modules 210 may be represented as a single module or a combination of different modules.

In some embodiments, the vehicle localization module 220 may be responsible for an initial position of the vehicle 105. The vehicle localization module 220 may receive the initial position from the environment data 214 through, for example a function call application programming interface (API). The environment data 214 is provided to the vehicle localization module 220 by, for example Light Detection and Ranging (LIDAR) system, image capturing devices, Global Positioning System (GPS), and the like. The vehicle localization module 220 may also receive the navigation data from the navigation module 232 based on vehicle speed through a function call API using wheel encoders as well as orientation of the vehicle 105. An Inertia Measurement Unit (IMU) sensor in the sensors 204 determines the sensor data 212 including orientation or direction of the vehicle 105 in correspondence to the static map. The vehicle localization module 220 may then generate a current position of the vehicle 105 based on the environment data 214 and the navigation data.

In some embodiments, the source destination provider module (SDPM) 222 may provide a user interface to the user 110 for providing the source point and the destination point on the static map for journey of the vehicle 105. The source point, for example point A, will be the point where the vehicle 105 is placed. The vehicle localization module 220 may help in selecting the point A. The destination point, point B will be the end of journey of the vehicle 105.

In some embodiments, the multiple path generation module 224 may receive the source point and the destination point from the SDPM 222, the environment data 214, and the current position of the vehicle 105 from the vehicle localization module 220. The multiple path generation module 224 subsequently provides one or more planned paths to follow from the source point, point A, to the destination point, point B, for example based on LIDAR generated static map. The multiple path generation module 224 further employs one or more path planning methods to generate the one or more planned paths including A-star method, DIJK-STRAS method and the like.

In some embodiments, the dynamic path planning module 226 may generate an optimal trajectory from the current position of the vehicle 105 to field of view (FOV) of the vehicle 105 considering a segment of the planned path as reference. The dynamic path planning module 226 may incorporate obstacle avoidance methods for re-planning in case of obstacle detection along the optimal path, and provides suitable velocity values for various coordinate points in the optimal path.

In some embodiments, the path profile data module (PPDM) 228 may receive the one or more planned paths and perform path profiling of each planned path. By traversing the coordinate points in each planned path, path parameters including straight stretches, turn stretches, width, and the like, are determined.

In some embodiments, the optimal path selection module 230 may analyse the path profile data 218 based on the path profiling of the planned paths with respect to vehicle parameters including the vehicle speed graph data 216 to determine quality of each planned path. Based on the quality of each planned path, a comparison is made to determine the optimal path.

In some embodiments, the navigation module 232 may apply a generated command velocity, which combine the linear velocity and angular velocity, for the vehicle 105 by the dynamic path planning module 226. An updated position of the vehicle 105 due to applied command velocity provides input to the vehicle localization module 220.

Henceforth, the process of performing the path profiling of the one or more planned paths is explained with the help of one or more examples for better understanding of the present disclosure. However, the one or more examples should not be considered as limitation of the present disclosure.

Consider an exemplary scenario as shown in the FIG. 2B, where the one or more planned paths generated between the source point and the destination point by the multiple path generation module 224 is received by the path profile data module (PPDM) 228. The PPDM 228 performs subsequent steps to analyse properties of the one or more planned paths. Each planned path includes a number of coordinate points, represented as pixels, on a static map as shown in FIG. 2B. In a first step, the PPDM 228 may identify at least one of one or more straight stretches or one or more turn stretches in a planned path 236 and analyses the planned path 236 from the source point for such purposes. In order to identify the one or more straight stretches, a segment 238 of the planned path 236 is analysed as shown in FIG. 2B. The PPDM 228 may connect a first coordinate point and a second coordinate point in the segment 238 on the static map with a base line 240. The PPDM 228 may determine one or more reference lines 242, 244, and 246 by connecting the first coordinate point with each consecutive coordinate point. The PPDM 228 may measure deviation angles between the base line 240 and each of the one or more reference lines 242, 244 and 246. The PPDM 228 may identify a straight stretch in the planned path 236 if a maximum angular threshold is reached based on measuring the deviation angles. The maximum angular threshold indicates a turn stretch in the planned path. The straight stretch includes coordinate points until the turn stretch. The PPDM 228 may further shift the base line 240 to identify another straight stretch or another turn stretch in the planned path 236. For instance, as illustrated in FIG. 2C, the base line 240 is shifted and is now a base line 248. A segment 250 of the planned path 236 is subsequently analysed using the base line 248 to start the analysis. As explained above, the one or more straight stretches in the planned path 236 are thus identified.

The one or more straight stretches and the one or more turn stretches together represent one or more path stretches in the planned path 236. In order to identify the one or more turn stretches, a segment 252 of the planned path 236 is analysed as shown in FIG. 2D. The PPDM 228 may connect each two consecutive coordinate points with a line, for example a base line 254 and one or more reference lines 256, 258, 260 and 262. The PPDM 228 further measures curvature angles between each two consecutive coordinate points. For instance, a curvature angle is measure between the base line 254 and the reference line 256. If the curvature angles are higher than a threshold value, the PPDM 228 may determine continuance of curvature of a turn stretch in the planned path 236. If the curvature angles are lesser than the threshold value, the PPDM 228 may determine an end of the curvature of the turn stretch in the planned path 236. The PPDM 228 may determine the measure of curvature for the turn stretch based on the end of the curvature of the turn stretch. In some embodiments, the measure of curvature is determined by a cumulative angular shift in which the curvature angles for the turn stretch are cumulated or combined. The PPDM 228 may further shift the base line 254 on identifying the end of the curvature of the turn stretch in the planned path 236 to identify another straight stretch or another turn stretch in the planned path 236. For instance, as illustrated in FIG. 2E, the base line 254 is shifted and is now a base line 264. A segment 266 of the planned path 236 is subsequently analysed using the base line 264 to start the analysis. As explained above, the one or more turn stretches in the planned path 236 are thus identified.

In a third step, the PPDM 228 may determine corresponding widths of the planned path 236 for the one or more path stretches. A segment 268 of the planned path 236 is analysed as shown in FIG. 2F(1). The PPDM 228 may identify three consecutive coordinate points, for instance coordinate points 270, 272 and 274, in a path stretch on the static map. The PPDM 228 may draw a horizontal straight line 276 on the three consecutive coordinate points 270, 272 and 274 and a perpendicular line 278 to the horizontal straight line 276 to determine a first boundary point 280 and a second boundary point 282 on the static map. The perpendicular line 278 includes first distance d1 and a second distance d2, as illustrated in FIG. 2F(2). The processor 120 may determine the width of the planned path 236 by combining the first distance d1 and the second distance d2, for example d1+d2. The first distance d1 represents a length between the horizontal straight line 276 and the first boundary point 280 and the second distance d2 represents a length between the horizontal straight line 276 and the second boundary point 282. As explained above, the width of the planned path 236 for the one or more path stretches are thus identified.

Based on the above analysis of the planned path 236, the planned path 236 is segmented into the one or more path stretches of varying length and curvature, as illustrated in FIG. 2G. For instance, in FIG. 2G, the one or more path stretches include a 3 metre straight stretch, a 1 meter turn stretch of 5 degree curvature, another 3 metre straight stretch, a 2 meter turn stretch of 5 degree curvature, a 10 metre straight stretch, a 2 meter turn stretch of 3 degree curvature, an 8 metre straight stretch, a 2 meter turn stretch of 55 degree curvature, a 1 metre straight stretch, a 2 meter turn stretch of 65 degree curvature, and a 3 metre straight stretch. The straight stretches are represented as straight stretches 284 and the turn stretches are represented as turn stretches 286. FIG. 2H illustrates a table in which, the properties of the one or more path stretches of the planned path 236 illustrated in FIG. 2G are mathematically represented. For instance, the 3 metre straight stretch has a width of the planned path 236 equivalent to 2 times vehicle width, which means that the planned path 236 has a normal width. In another example, for another 3 metre straight stretch, a width of the planned path 236 is equivalent to 1.5 times the vehicle width, which means that the planned path 236 has a narrow width for that 3 metre straight stretch. In another example, for the 2 meter turn stretch of 55 degree curvature the curvature of the planned path 236 is determined to be steep.

Henceforth, the process of determining the quality of the one or more planned paths based on the path profiling and the vehicle parameters is explained with the help of one or more examples for better understanding of the present disclosure. However, the one or more examples should not be considered as limitation of the present disclosure.

Consider an exemplary scenario as shown in the FIG. 2I, where the optimal path selection module 230 receives data from the PPDM 228 based on the path profiling performed in the PPDM 228 for each of the one or more planned paths. The optimal path selection module 230 also receives the vehicle parameters of the vehicle 105. Upon receiving the data and the vehicle parameters, the optimal path selection module 230 evaluates the quality of each planned path. As illustrated in FIG. 2I, a planned path 288 and a planned path 290 are considered between a source point A and a destination point B. The planned path 288 and the planned path 290 are path profiled and the vehicle parameters are received from the PPDM 228. In an example, the vehicle parameters including speed graph data are determined as per FIG. 2J(1), FIGS. 2J(2), and 2J(3). FIG. 2J(1) illustrates a table in which linear velocity and angular velocity of the vehicle 105 are detailed. For instance, for a linear velocity of 0.5 meter/second, the angular velocity of the vehicle 105 is 45 degree/second. Similarly, FIG. 2J(2) illustrates a table in which maximum achieved velocity ($V_{max}$) of the vehicle 105 is determined for the straight stretches. For instance, for a straight stretch having length ($S_{length}$) less than 5 meters, the $V_{max}$ is determined to be 0.8 meters/second. FIG. 2J(3) illustrates a table in which the $V_{max}$ of the vehicle 105 is determined for the turn stretches. For instance, for a turn stretch having overall curvature of 45 degrees, the $V_{max}$ is determined to be 0.5 meters/second.

The above vehicle parameters are then compared with the data received from the PPDM 228 based on the path profiling the planned paths, for example the planned path 288 and the planned path 290. Based on such comparison, the quality of the planned path for the vehicle 105 is determined based on three qualitative measures, for example travel time of a stretch, acceleration factor and caution factor.

The travel time of the stretch (Tt) for a straight stretch and a turn stretch is determined as per below equations (1) and (2), respectively:

$$T_t = \text{Stretch length}/(1.5 * \text{Maximum\_achieved velocity\_for\_straight stretch}) \quad (1)$$

$$T_t = \text{Stretch Length}/(1.5 * \text{Maximum achieved velocity\_for\_turn stretch}) \quad (2)$$

In the equation (1), the stretch length and the maximum achieved velocity_for_the straight stretch is taken from the table of FIG. 2J(2). Similarly, in the equation (2), the stretch length and the maximum achieved velocity_for_the turn stretch is taken from the table of FIG. 2J(3).

The acceleration factor (Ta) for different stretches of the planned path is determined as per below equation (3). The acceleration factor Ta is determined to be lower if the curvature is high and is higher f the curvature is low. In some embodiments, the acceleration factor Ta may have a range between 0.0 and 1.0.

$$T_a = 1.02 * \text{Stretch length} * (1/\text{Overall Curvature}) \quad (3)$$

The caution factor (Tc) is inversely proportional to width of the planned path. If the planned path includes path stretches that are of poor quality, the caution factor Tc is determined to be higher for those path stretches. In some embodiments, the caution factor Tc may have a range between 0.0 and 1.0.

FIG. 2K illustrates a table in which the three qualitative measures described above are detailed for a planned path including path stretches. In one instance, for a straight stretch of 3 meters having a width of 2*Vw, the travel time of the stretch (Tt) is 4.5 seconds, the acceleration factor (Ta) is 0.5 and the caution factor (Tc) is 0.1. In another instance, for a 1 meter turn stretch of 5 degrees curvature, the travel time of the stretch (Tt) is 1.5 seconds, the acceleration factor (Ta) is 0.2 and the caution factor (Tc) is 0.2.

Hence, a quality of the planned path can be represented based on equation (4):

$$\text{Qpath} = \Sigma(Tt*Ta) - \Sigma(Tt*Tc) \quad (4)$$

The quality of the planned path 288 and the quality of the planned path 290 is thereby prepared and the planned path having a better quality is selected.

The DPPM 226 and the navigation module 232 accomplish the navigation of the vehicle 105 in a combined manner. The DPPM 226 first receives the planned path selected by the optimal path selection module 230. A reference path stretch up to a certain length in front of the vehicle 105 is pre-determined based on vehicle visibility. The DPPM 226 generates one or more trajectories along the reference path stretch. The trajectories are micro plans of vehicle motion, defined as possible velocity values at uniform intervals. A cost is determined for each of the trajectories and a trajectory with lowest cost is selected for the vehicle 105 to follow. The navigation module 232 recalculates the possible velocity values for the trajectory based on vehicle current velocity, position on map and target velocity guide on the trajectory. This velocity value is applied on wheel base of the vehicle 105. The navigation of the vehicle is thus controlled by the DPPM 226 and the navigation module 232 by performing the above steps at constant intervals. After each interval, the vehicle 105 is localized on the map using the vehicle localization module 220.

FIG. 3 shows a flowchart illustrating a method of determining an optimal path for navigation of a vehicle, in accordance with some embodiments of the present disclosure.

As illustrated in FIG. 3, the method 300 includes one or more blocks illustrating a method of determining an optimal path for navigation of a vehicle, for example the vehicle 105 of FIG. 1. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 305, the method 300 may include receiving, by an optimal path selection system associated with the vehicle, for example the optimal path selection system 115 associated with the vehicle 105 of FIG. 1, a source point and a destination point from a user. In some embodiments, the I/O interface 125 of the optimal path selection system 115 may receive the source point and the destination point from the user 110.

In an example, the SDPM 222 of FIG. 2, behaving as a user interface, provides the source point and the destination point received from the I/O interface 125 to the multiple path generation module 224. The SDPM 222 enables display of a navigation screen with navigation map as well as options to choose the source point and the destination point to generate the planned path. After selecting the source point and the destination point, the SDPM 222 shall trigger a start event. In some embodiments, if the source point is selected by the user manually, in absence of an automatic localization method, the user should have prior knowledge of position of the vehicle on the map.

At block 310, the method 300 may include generating, by the optimal path selection system, one or more planned paths between the source point and the destination point. In some embodiments, the processor 120 may generate the one or more planned paths.

In an example, the vehicle localization module 220 and the SDPM 222 is used to generate the one or more planned paths. On receiving the start event from the SDPM 222, the one or more planned paths are generated by the multiple path generation module 224 using one or more path planning methods. Examples of the one or more path planning methods include but are not limited to, A-star method, Dijkstra method, and the like. The one or more planned paths may differ in routes, lengths, widths, and the like. For instance, a few planned paths may provide long routes while other planned paths may provide shorter routes. Similarly, some planned paths may provide wider paths while other planned paths may provide narrower paths. In some instances, some planned paths that avoid turns may be generated.

At block 315, the method 300 may include, performing, by the optimal path selection system, path profiling of the one or more planned paths based on one or more path parameters. In some embodiments, the processor 120 may perform the path profiling of the one or more planned paths based on the one or more path parameters. Examples of the one or more path parameters include, but are not limited to, straight stretches, turn stretches, widths of the planned paths, and the like.

In some embodiments, the PPDM 228 performs the path profiling of the planned paths after receiving details of the planned paths from the multiple path generation module 224, Each planned path is represented with a number of coordinate points, represented as pixels, on a static map. In order to perform the path profiling of a planned path, one or more straight stretches and turn stretches, together represented as path stretches, are identified in the planned path. Further, widths of the path stretches are also determined. The method of path profiling is explained in detail with reference to FIG. 2 and are not explained herein for sake of brevity.

At block 320, the method 300 may include, determining, by the optimal path selection system, quality of the one or more planned paths based on the path profiling and vehicle parameters. Further, the processor 120 may determine the quality associated with each planned path. In some embodiments, the optimal path selection module 230 may determine the quality of each planned path based on the path profiling and the vehicle parameters. Examples of the vehicle parameters include, but are not limited to, speed graph data, and the like. The method of determining the quality of each planned path is explained in detail with reference to FIG. 2 and are not explained herein for sake of brevity.

At block 325, the method 300 may include selecting, by the optimal path selection system, the optimal path from the one or more planned paths based on the quality to navigate the vehicle. The processor 120 may select the optimal path from the one or more planned paths. In some embodiments, the optimal path selection module 230 may select the optimal path for navigation. In some embodiments, the vehicle parameters are compared with the data received from the PPDM 228 based on the path profiling of the planned paths. Based on such comparison, the quality of each planned path is determined based on three qualitative measures, for example travel time of a stretch, acceleration factor and caution factor. The method of selecting the optimal path is explained in detail with reference to FIG. 2 and are not explained herein for sake of brevity.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention, in some embodiments, the computer system 400 can be optimal path selection system 115 that is used for determining an optimal path for navigation of the vehicle 105. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (for example, Code-Division Multiple Access (CDMA), High-Speed Packet Access (HSPA+), Global System For Mobile Communications (GSM), Long-Term Evolution (LTE). WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (for example, twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with optimal path selection module 410. The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (for example, RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), integrated Drive Electronics (IDE), IEEE-1394, Universal Serial Bus (USE), fibre channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (for example, BERKELEY SOFTWARE DISTRIBUTION® (BSD), FREEBSD®, NETBSD®, OPENBSD, etc.), LINUX® DISTRIBUTIONS (E. G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User interfaces (GUIs) may be employed, including, without limitation, Apple® Macintosh® operating systems' Aqua®, IBMS OS/2®, Microsoft® Windows® (for example, Aero, Metro, etc.), web interface libraries (for example, ActiveX®, Java®, Javascript®, AJAX, HTML, Adobe® Hash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

The present disclosure provides a method and a system for determining an optimal path for navigation of a vehicle.

The present disclosure provides the optimal path for navigating the vehicle between a source point and a destination point provided by a user. The user can choose to travel the optimal path thus provided as the user is well-informed of the quality of the optimal path and feels safer to travel with such information in hand. The present disclosure eliminates any surprises, for example a steep curve or a narrow stretch, in a path that the user may have come across otherwise.

The present disclosure generates the optimal path based on path profiling of planned paths and vehicle parameters. Therefore, the optimal path helps in achieving a smooth and safe navigation experience by minimizing travel time and providing the quality of the optimal path.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for determining an optimal path for navigation of a vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of determining an optimal path for navigation of an autonomous vehicle, the method comprising:
    receiving, by an optimal path selection system associated with the autonomous vehicle, a source point and a destination point from a user;
    generating, by the optimal path selection system, one or more planned paths on a static map, between the source point and the destination point;
    performing, by the optimal path selection system, path profiling of the one or more planned paths based on one or more path parameters, wherein the path profiling for one or more path stretches in a planned path is performed by:
        connecting a first coordinate point and a second coordinate point associated with a first path stretch on the static map with a base line;
        determining one or more reference lines by connecting the first coordinate point with each consecutive coordinate point associated with the first path stretch;
        identifying that the first path stretch in the planned path is a straight stretch or a turn stretch based on (i) deviation angles between the base line and each of the one or more reference lines and (ii) curvature angles between two consecutive reference lines,
        wherein the base line is shifted to a new base line for a second path stretch in the planned path upon identifying the first path stretch as the straight stretch or the turn stretch; and
        determining: (i) travel time (Tt) based on stretch length and maximum achievable velocity for traversing each path stretch, (ii) acceleration factor (Ta) of the vehicle achievable for each path stretch based on a curvature measure associated with each path stretch, and (iii) caution factor (Tc) based on corresponding widths of each path stretch;
    determining, by the optimal path selection system, quality of the one or more planned paths based on the path profiling parameters indicating travel time (Tt), acceleration factor (Ta) and caution factor (Tc) for each path stretch and one or more vehicle parameters;
    selecting, by the optimal path selection system, the optimal path from the one or more planned paths based on the quality; and
    controlling, by the optimal path selection system, navigation of the autonomous vehicle along the selected planned path by generating an optimal trajectory from a current position of the autonomous vehicle to field of view (FOV) of the autonomous vehicle considering a segment of the selecting planned path as reference.

2. The method as claimed in claim 1, wherein the one or more planned paths are generated using one or more path planning methods.

3. The method as claimed in claim 1, wherein performing the path profiling of the one or more planned paths comprises:
    Identifying:
        one or more straight stretches in a planned path, the planned path being represented with a number of coordinate points on the static map; or one or more turn stretches in the planned path, the one or more straight stretches and the one or more turn stretches together representing the one or more path stretches in the planned path; and determining the corresponding widths of the planned path for the one or more path stretches.

4. The method as claimed in claim 3, wherein identifying the one or more straight stretches in the planned path comprises:

identifying the straight stretch in the planned path if a maximum angular threshold is reached based on the deviation angles between the base line and each of the one or more reference lines, the maximum angular threshold indicating the turn stretch in the planned path.

5. The method as claimed in claim 3, wherein identifying the one or more turn stretches in the planned path comprises:

measuring the curvature angles between each two consecutive coordinate points, two consecutive coordinate points being connected with a line;

if the curvature angles are higher than a threshold value, determining continuance of curvature of a turn stretch in the planned path;

if the curvature angles are lesser than the threshold value, determining an end of the curvature of the turn stretch in the planned path; and determining the measure of curvature for the turn stretch based on the end of the curvature of the turn stretch.

6. The method as claimed in claim 5 and further comprising:

shifting a base line on identifying the end of the curvature of the turn stretch in the planned path to identify another straight stretch or another turn stretch in the planned path.

7. The method as claimed in claim 5, wherein the measure of curvature is determined by combining the curvature angles for the turn stretch.

8. The method as claimed in claim 3, wherein determining the corresponding widths of the planned path for the one or more path stretches comprises:

identifying three consecutive coordinate points in a path stretch on the static map;

drawing a horizontal straight line on the three consecutive coordinate points and a perpendicular line to the horizontal straight line to determine a first boundary point and a second boundary point on the static map, the perpendicular line comprising a first distance and a second distance; and determining the width of the planned path by combining the first distance and the second distance, the first distance representing a length between the horizontal straight line and the first boundary point and the second distance representing a length between the horizontal straight line and the second boundary point.

9. The method as claimed in claim 1, wherein determining the quality of the one or more planned paths based on the path profiling and vehicle parameters comprises:

comparing the vehicle parameters of the vehicle with the one or more path parameters for each planned path of the one or more planned paths.

10. An optimal path selection system for determining an optimal path for navigation of an autonomous vehicle, the optimal path selection system comprising:

a processor; and a memory communicatively coupled to the processor, wherein the memory stores the processor-executable instructions, which, on execution, causes the processor to:

receive a source point and a destination point from a user;

generate one or more planned paths on a static map, between the source point and the destination point;

perform path profiling of the one or more planned paths based on one or more path parameters, wherein the path profiling for one or more path stretches in a planned path is performed by:

connecting a first coordinate point and a second coordinate point associated with a first path stretch on the static map with a base line;

determining one or more reference lines by connecting the first coordinate point with each consecutive coordinate point associated with the first path stretch;

identifying that the first path stretch in the planned path is a straight stretch or a turn stretch based on (i) deviation angles between the base line and each of the one or more reference lines and (ii) curvature angles between two consecutive reference lines, wherein the base line is shifted to a new base line for a second path stretch in the planned path upon identifying the first path stretch as the straight stretch or the turn stretch; and determine: (i) travel time (Tt) based on stretch length and maximum achievable velocity for traversing each path stretch, (ii) acceleration factor (Ta) of the vehicle achievable for each path stretch based on a curvature measure associated with each path stretch, and (iii) caution factor (Tc) based on corresponding widths of each path stretch;

determine quality of the one or more planned paths based on the path profiling parameters indicating travel time (Tt), acceleration factor (Ta) and caution factor (Tc) for each path stretch and one or more vehicle parameters;

select the optimal path from the one or more planned paths based on the quality; and control navigation of the autonomous vehicle along the selected planned path by generating an optimal trajectory from a current position of autonomous vehicle to field of view (FOV) of the autonomous vehicle considering a segment of the selecting planned path as reference.

11. The optimal path selection system as claimed in claim 10, wherein the one or more planned paths are generated using one or more path planning methods.

12. The optimal path selection system as claimed in claim 10, wherein the processor performs the path profiling of the one or more planned paths by:

Identifying:

one or more straight stretches in a planned path, the planned path being represented with a number of coordinate points on a static map; or one or more turn stretches in the planned path, the one or more straight stretches and the one or more turn stretches together representing the one or more path stretches in the planned path; and determining the corresponding widths of the planned path for the one or more path stretches.

13. The optimal path selection system as claimed in claim 12, wherein the processor identifies the one or more straight stretches in the planned path by:

identifying the straight stretch in the planned path if a maximum angular threshold is reached based on the deviation angles between the base line and each of the one or more reference lines, the maximum angular threshold indicating the turn stretch in the planned path.

14. The optimal path selection system as claimed in claim 12, wherein the processor identifies the one or more turn stretches in the planned path by:
- measuring the curvature angles between each two consecutive coordinate points, two consecutive coordinate points being connected with a line;
- if the curvature angles are higher than a threshold value, determining continuance of curvature of a turn stretch in the planned path;
- if the curvature angles are lesser than the threshold value, determining an end of the curvature of the turn stretch in the planned path; and
- determining the measure of curvature for the turn stretch based on the end of the curvature of the turn stretch.

15. The optimal path selection system as claimed in claim 14 and wherein the processor further comprises:
- shifting a base line on identifying the end of the curvature of the turn stretch in the planned path to identify another straight stretch or another turn stretch in the planned path.

16. The optimal path selection system as claimed in claim 14, wherein the measure of curvature is determined by combining the curvature angles for the turn stretch.

17. The optimal path selection system as claimed in claim 12, wherein the processor determines the corresponding widths of the planned path for the one or more path stretches by:
- identifying three consecutive coordinate points in a path stretch on the static map;
- drawing a horizontal straight line on the three consecutive coordinate points and a perpendicular line to the horizontal straight line to determine a first boundary point and a second boundary point on the static map, the perpendicular line comprising a first distance and a second distance; and
- determining the width of the planned path by combining the first distance and the second distance, the first distance representing a length between the horizontal straight line and the first boundary point and the second distance representing a length between the horizontal straight line and the second boundary point.

18. The optimal path selection system as claimed in claim 10, wherein the processor determines the quality of the one or more planned paths based on the path profiling and vehicle parameters by:
- comparing the vehicle parameters of the vehicle with the one or more path parameters for each planned path of the one or more planned paths.

19. A non-transitory computer readable medium including instructions stored thereon that when processed by at least one processor causes an optimal path selection system associated with an autonomous vehicle to perform operations comprising:
- receiving a source point and a destination point from a user;
- generating one or more planned paths on a static map, between the source point and the destination point;
- performing path profiling of the one or more planned paths based on one or more path parameters, wherein the path profiling for one or more path stretches in a planned path is performed by:
  - connecting a first coordinate point and a second coordinate point associated with a first path stretch on the static map with a base line;
  - determining one or more reference lines by connecting the first coordinate point with each consecutive coordinate point associated with the first path stretch;
  - identifying that the first path stretch in the planned path is a straight stretch or a turn stretch based on (i) deviation angles between the base line and each of the one or more reference lines and (ii) curvature angles between two consecutive reference lines,
  - wherein the base line is shifted to a new base line for a second path stretch in the planned path upon identifying the first path stretch as the straight stretch or the turn stretch; and
  - determining: (i) travel time (Tt) based on stretch length and maximum achievable velocity for traversing each path stretch, (ii) acceleration factor (Ta) of the vehicle achievable for each path stretch based on a curvature measure associated with each path stretch, and (iii) caution factor (Tc) based on corresponding widths of each path stretch;
- determining quality of the one or more planned paths based on the path profiling parameters indicating travel time (Tt), acceleration factor (Ta) and caution factor (Tc) for each path stretch and one or more vehicle parameters;
- selecting the optimal path from the one or more planned paths based on the quality to navigate the vehicle; and
- controlling navigation of the autonomous vehicle along the selected planned path by generating an optimal trajectory from a current position of autonomous vehicle to field of view (FOV) of the autonomous vehicle considering a segment of the selecting planned path as reference.

* * * * *